(12) United States Patent
Haigh

(10) Patent No.: US 10,589,304 B1
(45) Date of Patent: Mar. 17, 2020

(54) COMBINATION ANIMAL DETERRENT CANISTER AND CARRIER DEVICE

(71) Applicant: Dustin Haigh, Edmonton (CA)

(72) Inventor: Dustin Haigh, Edmonton (CA)

( * ) Notice: Subject to any disclaimer, the term of this patent is extended or adjusted under 35 U.S.C. 154(b) by 0 days.

(21) Appl. No.: 16/366,822

(22) Filed: Mar. 27, 2019

(51) Int. Cl.
*B05B 12/00* (2018.01)
*B05B 11/00* (2006.01)
*A01M 29/00* (2011.01)

(52) U.S. Cl.
CPC .......... *B05B 12/002* (2013.01); *A01M 29/00* (2013.01); *B05B 11/0008* (2013.01)

(58) Field of Classification Search
CPC .. B05B 12/002; B05B 11/0008; A01M 29/00; A01M 29/12
USPC ........................................................ 222/505
See application file for complete search history.

(56) References Cited

U.S. PATENT DOCUMENTS

| 3,229,851 | A | * | 1/1966 | Horwitt et al. ...... A62C 13/003 222/49 |
| 3,523,645 | A | * | 8/1970 | Beauchamp .......... A01M 29/12 239/154 |
| 4,171,463 | A | | 10/1979 | Watkins |
| 4,186,855 | A | * | 2/1980 | Edman ................ B05B 11/3057 222/321.8 |
| 4,338,886 | A | | 7/1982 | McBride |
| 4,602,384 | A | | 7/1986 | Schneider |
| 5,289,164 | A | * | 2/1994 | Novak ...................... F41H 9/10 116/DIG. 44 |
| 8,383,138 | B2 | | 2/2013 | Drew |
| 8,651,396 | B2 | | 2/2014 | Spearman, Sr. |
| 9,072,289 | B1 | * | 7/2015 | Lucas .................... A01M 29/12 |
| 2005/0197686 | A1 | | 9/2005 | Vlad |
| 2009/0013938 | A1 | | 1/2009 | Miller et al. |
| 2009/0294615 | A1 | * | 12/2009 | Huang ................. B65D 83/202 248/229.22 |
| 2010/0155399 | A1 | * | 6/2010 | Wilson .................. A01M 29/12 220/87.2 |
| 2011/0047883 | A1 | | 3/2011 | Greiner |
| 2015/0007487 | A1 | | 1/2015 | Leis et al. |
| 2017/0094890 | A1 | * | 4/2017 | Papke ..................... F16C 1/102 |

FOREIGN PATENT DOCUMENTS

| CA | 2802515 | 7/2014 |
| GB | 2508504 | 6/2014 |
| WO | 2005104885 | 11/2005 |

* cited by examiner

Primary Examiner — Donnell A Long
(74) Attorney, Agent, or Firm — Nathan V. Woodruff

(57) ABSTRACT

An animal deterrent canister with a pressurized vessel containing animal deterrent and a nozzle assembly with a flange, an actuator actuated by a downward pressure, and a nozzle for releasing animal deterrent from the pressurized vessel cooperates with a carrier device. The carrier device has a mounting structure for mounting to an object, a receiver for receiving the nozzle assembly of the animal deterrent canister, an actuator pin that moves between a retracted position away from the actuator and an extended position that depresses the actuator, and a cable housed within a sleeve. The receiver has an engagement profile that receives the flange in an interference engagement. One end of the cable is connected to the actuator pin and the other end is connected to a hand actuator that applies a compressive force to the cable relative to the sleeve to move the actuator pin to the extended position.

17 Claims, 5 Drawing Sheets

COMBINATION ANIMAL DETERRENT CANISTER AND CARRIER DEVICE

TECHNICAL FIELD

This relates to animal deterrent devices, and in particular, devices for deploying animal deterrent canisters.

BACKGROUND

Non-lethal substances are often provided in pressurized canisters that spray a stream of a deterrent toward an animal when actuated. The most common active ingredient in these types of animal deterrent is oleoresin capsicum, although other ingredients may also be used. These canisters, sometimes referred to as "bear spray", are typically carried by individuals travelling in areas where animal attacks may be a concern. However, it can be difficult during an attack to remove the canister from the holster or pocket where it is stored, and then aim the spray at the animal. U.S. Pat. No. 8,651,396 entitled PERSONAL DEFENSE DEVICE (Spearman, Sr.) teaches a device for deploying a deterrent substance in a location remote from a user's hand. U.S. Pat. No. 9,072,289 entitled BEAR REPELLANT DEVICE MOUNTED ON A BACKPACK (Lucas) teaches an alternative device for deploying a deterrent substance from the back of a user.

SUMMARY

According to an aspect, there is provided, in combination, an animal deterrent canister and a carrier device that carries the animal deterrent canister. The animal deterrent canister comprises a pressurized vessel containing animal deterrent and a nozzle assembly. The nozzle assembly has a flange that extends outward on at least two opposed sides of the nozzle assembly, a nozzle actuator that is actuated by a downward pressure, and a nozzle that releases animal deterrent from the pressurized vessel when the nozzle actuator is actuated. The carrier device comprises a body having a mounting structure for mounting the carrier device to an object, and a receiver for receiving the nozzle assembly of the animal deterrent canister. The receiver comprises an inner engagement profile that is sized and shaped to receive the flange of the nozzle assembly in an interference engagement such that the nozzle is directed away from the body and the nozzle actuator is toward the body relative to the nozzle. The receiver further comprises an actuator pin that moves between a retracted position away from the actuator and an extended position that depresses the actuator of the animal deterrent canister, the actuator pin being biased toward the retracted position, and pin actuator that, when activated, causes the actuator pin to move from the retracted position to the extended position.

According to other aspects, the combination above may comprise one or more of the following features, alone or in combination: the pin actuator may comprise a cable housed within a sleeve, the cable having a first end connected to the actuator pin and a second end connected to a hand actuator, the hand actuator applying a compressive force to the cable relative to the sleeve such that the cable moves the actuator pin from the retracted position to the extended position; the hand actuator may comprise a plunger; the receiver may comprise an opening, and the nozzle assembly may be inserted through the opening such that the nozzle is directed toward the opening; the body may be integrally formed; the mounting structure may be configured for mounting the carrier device to a backpack; and the carrier device may further comprise shoulder straps, clips, or ties attached to the mounting structure.

According to an aspect, there is provided a method of deterring an animal attack, the method comprising the steps of providing a carrier device, the carrier device comprising a body having a mounting structure for mounting the carrier device to an object, a receiver for receiving the nozzle assembly of the animal deterrent canister, the receiver comprising an inner engagement profile, an actuator pin, and pin actuator adjacent to the actuator pin; providing an animal deterrent canister, the animal deterrent canister comprising a pressurized vessel containing animal deterrent and a nozzle assembly having a flange, an actuator, and a nozzle, inserting the nozzle assembly of the animal deterrent canister into the carrier device such that the inner engagement profile of the receiver receives the flange of the nozzle assembly in an interference engagement, and such that the nozzle is directed away from the body and the nozzle actuator is toward the body relative to the nozzle, mounting the carrier device to an object, and actuating the hand actuator to apply a compressive force to the cable relative to the sleeve such that the cable moves the actuator pin from a retracted position away from the actuator to an extended position that applies a downward pressure to the actuator to depress the actuator of the animal deterrent canister and cause the nozzle to release animal deterrent from the pressurized vessel.

According to other aspects, the method may comprise one or more of the following features, alone or in combination: the pin actuator may comprise a cable housed within a sleeve, the cable having a first end connected to the actuator pin and a second end connected to a hand actuator; the actuator pin may be biased toward the retracted position; the hand actuator may comprise a plunger; the receiver may comprise an opening, and the nozzle assembly may be inserted through the opening such that the nozzle is directed toward the opening; the body may be integrally formed; the mounting structure may be configured for mounting the carrier device to a backpack; and the carrier device may further comprise shoulder straps, clips, or ties attached to the mounting structure.

In other aspects, the features described above may be combined together in any reasonable combination as will be recognized by those skilled in the art.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION OF PREFERRED EMBODIMENTS

Figure 1:
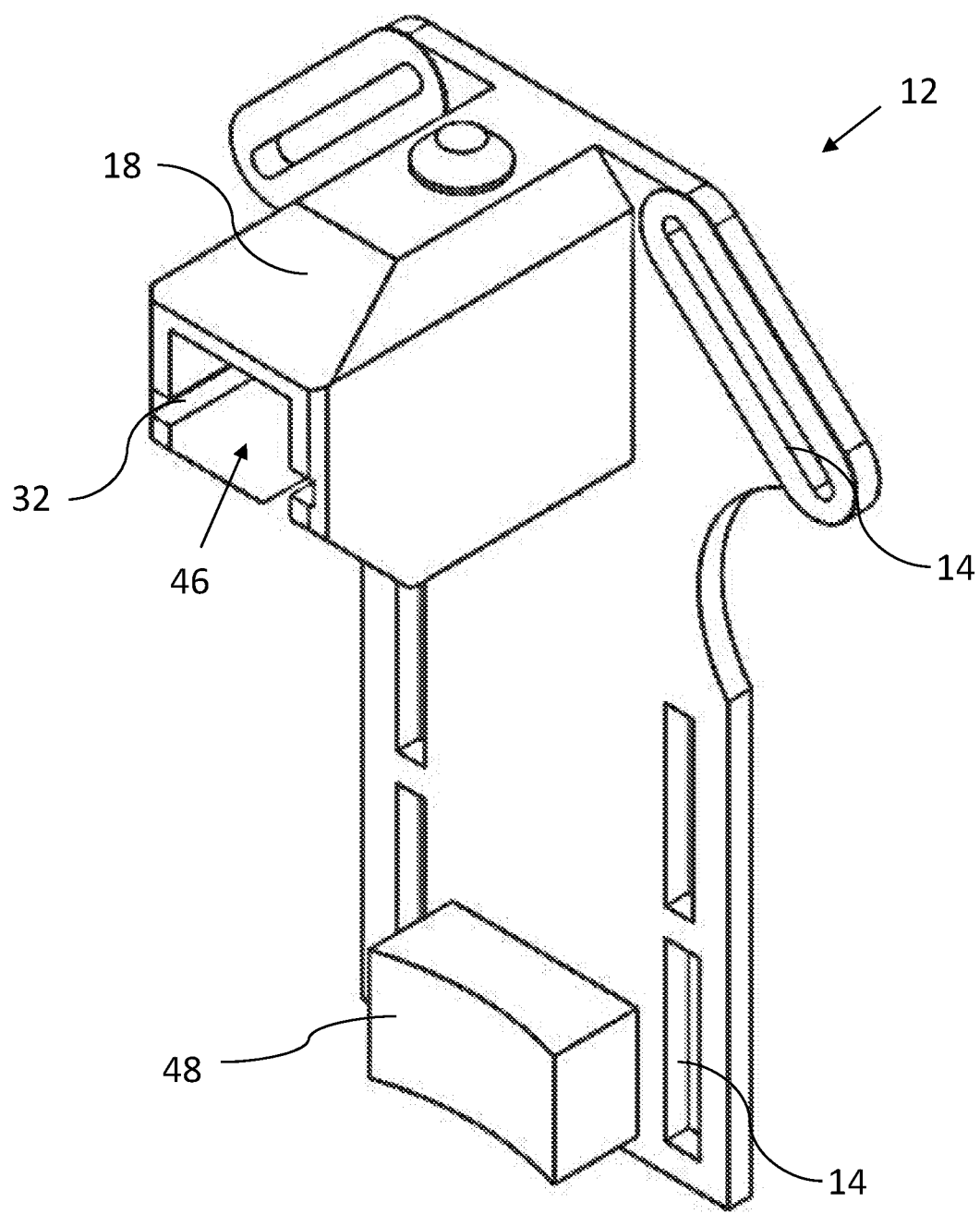
FIG. 1 is a perspective view of a carrier device.

A carrier device for carrying an animal deterrent canister, generally identified by reference numeral 10, will now be described with reference to FIG. 1 through 5.

Figure 2:
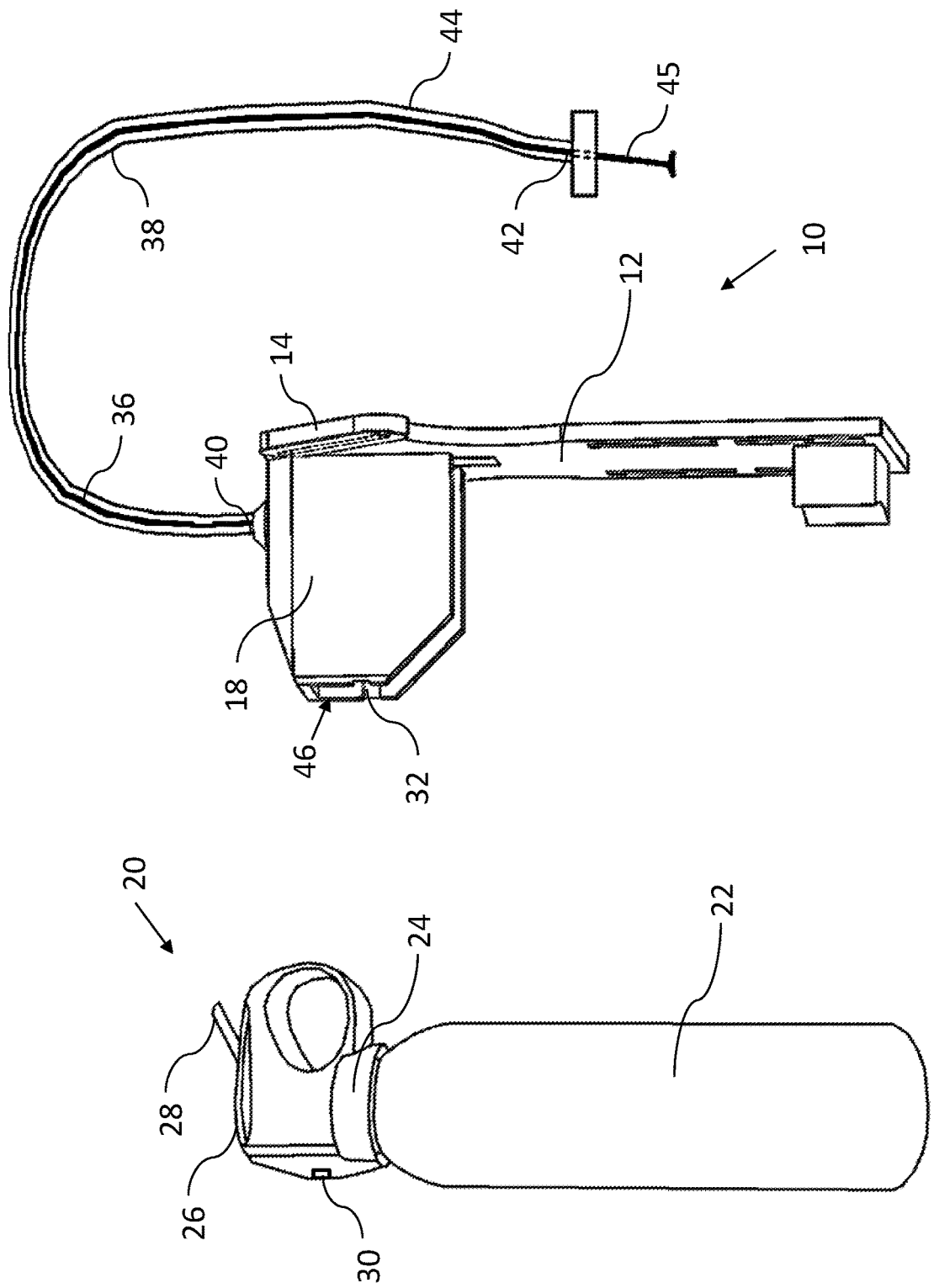
FIG. 2 is a side elevation view of an animal deterrent canister and a carrier device.
Figure 4:
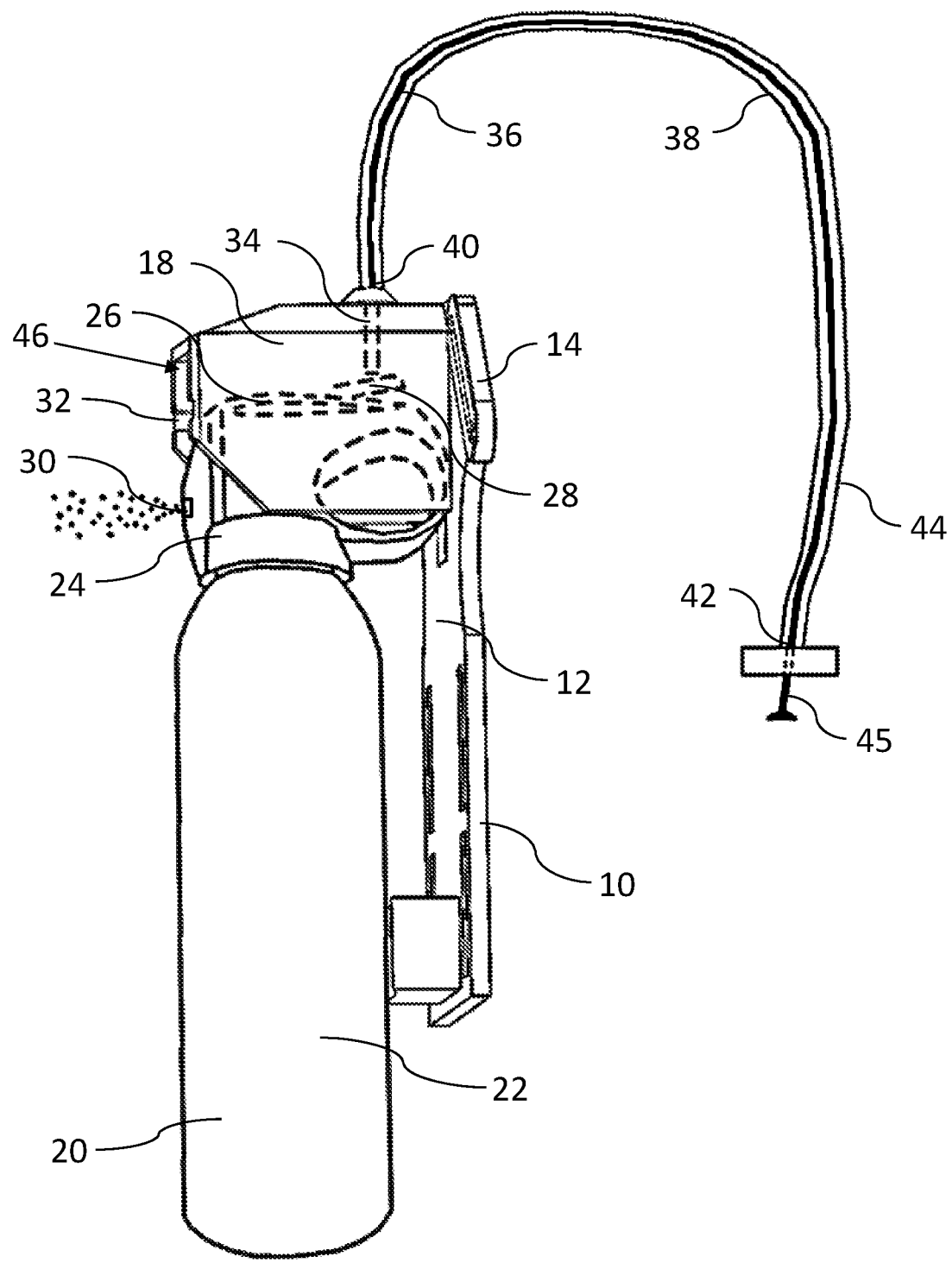
FIG. 4 is a side elevation view of an animal deterrent canister received within a carrier device after activation.
Figure 5:
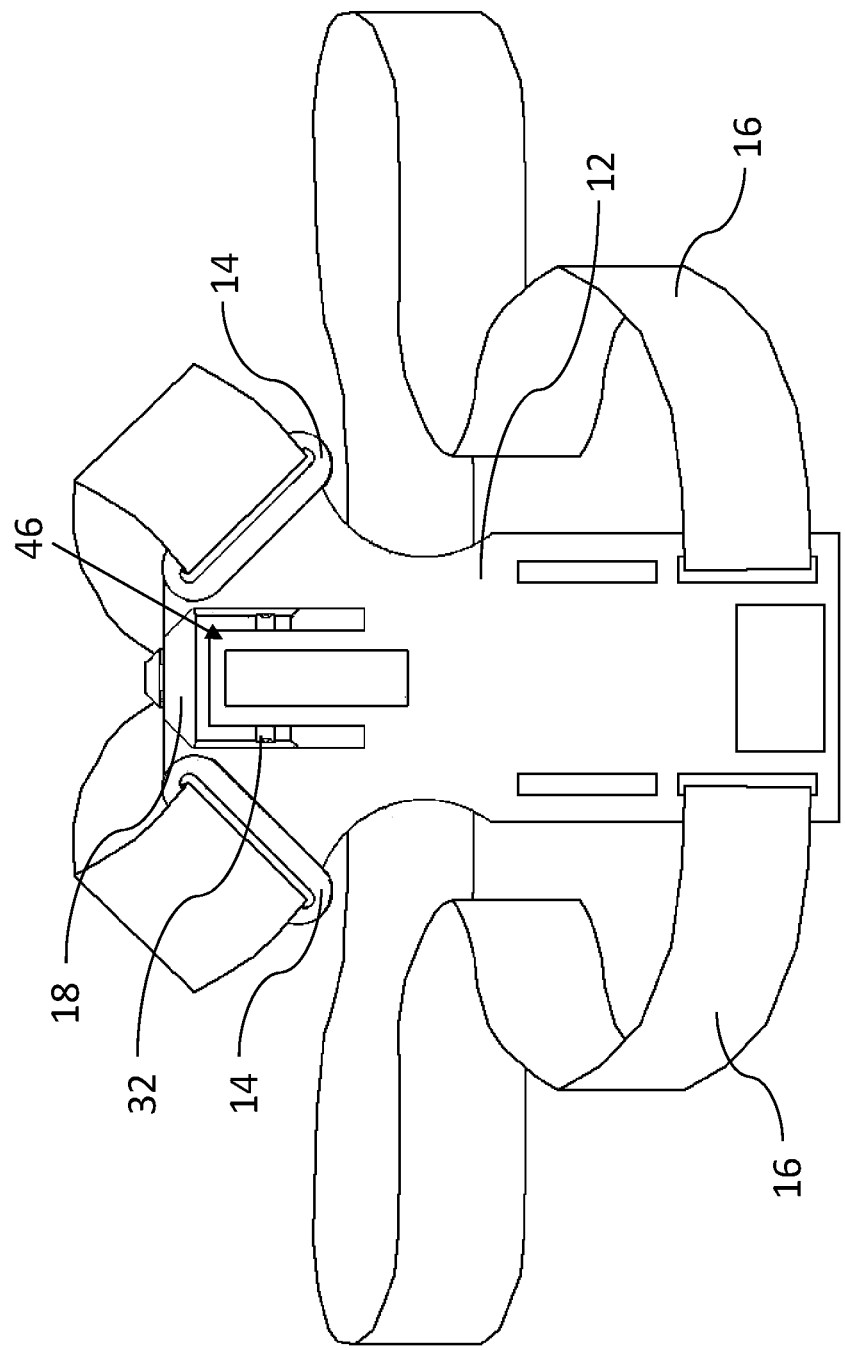
FIG. 5 is front elevation view of a carrier device having straps.

Referring to FIG. 2, carrier device 10 has a body 12 that is designed to carry an animal deterrent canister 20 and has a mounting structure 14 for mounting carrier device 10 to an object (not shown). Mounting structure 14 may be configured to mount to a variety of objects. For example, mounting structure 14 may be configured to attach carrier device 10 to a backpack, such as using alligator clips, hook and loop fasteners, straps, hooks, etc. As shown in FIG. 4, carrier device 10 may have shoulder straps 16 attached to mounting structure 14, which may be used to place carrier device 10 on the back of a person. Carrier device 10 may also be designed to attach to various objects, and may be provided with a suitable attachment, depending on the purpose, such as clips or ties attached to mounting structure 14, in a similar manner to shoulder straps 16 shown in FIG. 4, or other attachment devices such as stitching, hook and loop fasteners, or other types of fasteners as are known in the art.

Carrier device 10 is intended for use in combination with an animal deterrent canister 20, as shown in FIG. 2. Animal deterrent canister 20 has a pressurized vessel 22 that contains animal deterrent, such as pepper spray or bear spray, and a nozzle assembly 24. Nozzle assembly 24 has a flange 26, an actuator 28 that is actuated by a downward pressure, and a nozzle 30 for releasing animal deterrent from pressurized vessel 22 when actuator 28 is actuated. On most commercially available bear spray canisters, nozzle assembly 24 has a flange 26 that is generally similar in size, shape, and position, although there is some variation. Flange 26 typically involves two section that extend out on either side of nozzle 30 at the top of nozzle assembly 24.

Figure 3:
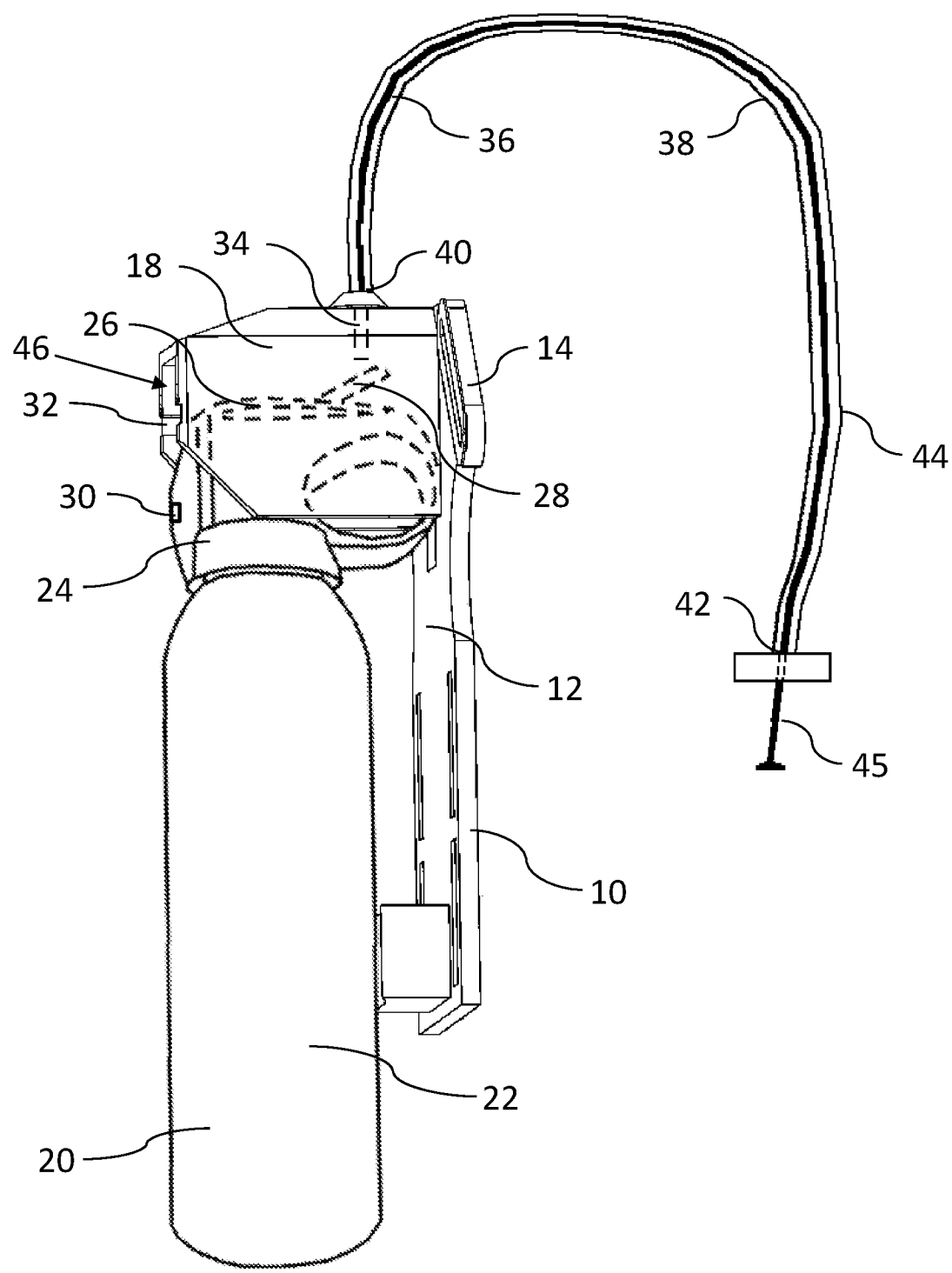
FIG. 3 is a side elevation view of an animal deterrent canister received within a carrier device prior to activation.

Referring to FIG. 1, body 12 has a receiver 18 that is sized and shaped to receive nozzle assembly 24 of animal deterrent canister 20. In particular, receiver 18 has an inner engagement profile 32 that is sized and shaped to receive flange 26 of nozzle assembly 24 in an interference engagement, as shown in FIG. 3. While flanges 26 are generally standard, there may be some variation in the size, shape and position of flanges 26 between manufacturers or suppliers of canisters 20. As such, receiver 18 is preferably sized to accommodate a range of nozzle assemblies, while still accommodating flange 26 and engaging flange 26 in an interference engagement. Body 12 may be integrally formed from a single piece of material, such as moulded plastic. Body 12 may also be formed with additional support components, such as stop 48 (shown in FIG. 1), which helps stabilize canister 20, and maintains a proper orientation of canister 20. To maintain engagement between canister 20 and stop 48, as well as to prevent canister 20 from being accidentally released from nozzle assembly 24, an additional strap (not shown) may be used. Referring to FIG. 3, when animal deterrent canister 20 is received in receiver 18, it is positioned such that nozzle 30 is directed away from body 12 and actuator 28 is toward body 12 relative to nozzle 30. Receiver 18 may have an opening 46, through which nozzle assembly 24 may be inserted such that nozzle 30 is directed toward opening 46. It will be understood that opening 46 may be provided with a cover or other retainer (not shown) that does not interfere with nozzle 30.

Carrier device 10 has an actuator pin 34 that moves between a retracted position away from actuator 28, as shown in FIG. 3, and an extended position that depresses actuator 28 of animal deterrent canister 20, as shown in FIG. 4. It will be understood that actuator pin 24 may take different sizes and shapes, and may not have a circular cross-section, provided that actuator in 24 is able to move into engagement with actuator 28 of canister 20, and is sufficiently large and structurally sound to displace actuator 28 when required. Actuator pin 34 is preferably biased toward the retracted position shown in FIG. 3, such as through use of a spring or other biasing device as are known in the art, or at the very least, releasably secured away from actuator 28 until activated by actuator pin 34. Carrier device 10 also has a cable 36 housed within a sleeve 38, cable 36 having a first end 40 connected to actuator pin 34 and a second end 42 connected to a pin actuator 44. Pin actuator 44 actuates actuator pin 34 by moving actuator pin 34 against nozzle actuator 28. Pin actuator 44 is generally hand operated by the user. In one example, pin actuator 44 includes a plunger 45, where the user's hand engages a portion attached to sleeve 38 and a portion attached to sleeve 38, and squeezes the two together in order to apply the compressive force to cable 36, such that cable 36 moves actuator pin 34 from the retracted position to the extended position. It will be understood that the required compression of cable 36 may be sufficient to provide the bias of actuator pin 34 toward the retracted position. Hand actuator 45 and cable 36/38 may also take other forms as are known in the art. For example, rather than cable 36 within a sleeve 38, sleeve 38 may be filled with hydraulic fluid, where hand actuator 45 applies pressure to the hydraulic fluid. Pin actuator 44 may also take different forms. For example, pin actuator 44 may be a solenoid valve that is activated by causing a switch to close a circuit, where the switch (not shown) would be connected by wires or wirelessly such that the switch would be within reaching distance of the user's hand. As another example, hand actuator 45 may include a hand actuated solenoid release valve that activates pin actuator 44, which may be a pneumatic release mechanism that releases a compressed air cylinder or cartridge in order to actuate actuator pin 34.

A method of deterring animal attack will now be described, in light of the example described above. Carrier device 10 and animal deterrent canister 20 are both provided, as shown in FIG. 2. Nozzle assembly 24 is inserted into carrier device 10 such that inner engagement profile 32 of receiver 18 receives flange 26 of nozzle assembly 24. In doing so, nozzle assembly 24 is oriented such that nozzle 30 is directed away from body 12 and actuator 28 is toward body 12 relative to nozzle 30, as shown in FIG. 3. Carrier device 10 is mounted to an object, such as a backpack, person, animal, or other object that may be attacked by an animal. It will be understood that carrier device 10 may also be mounted to an object empty, and animal deterrent canister 20 may be inserted after carrier device 10 is mounted to the objected. Cable 36 and sleeve 38 will typically be sufficiently long to allow for a person to grasp hand actuator 44 when carrier device 10 is mounted to the objected. When an animal attack occurs, hand actuator 44 is actuated to apply a compressive force to cable 36 relative to sleeve 38 such that cable 36 moves actuator pin 34 from a retracted position away from actuator 28 (FIG. 3) to an extended position (FIG. 4) that applies a downward pressure to actuator 28 to depress actuator 28 of animal deterrent canister 20 and cause nozzle 30 to release animal deterrent from pressurized vessel 22.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. In combination, an animal deterrent canister and a carrier device that carries the animal deterrent canister, wherein:
   the animal deterrent canister comprises:
      a pressurized vessel containing animal deterrent; and
      a nozzle assembly having a flange that extends outward on at least two opposed sides of the nozzle assembly, a nozzle actuator that is actuated by a downward pressure, and a nozzle that releases animal deterrent from the pressurized vessel when the nozzle actuator is actuated;
   the carrier device comprises:
      a body having:
         a mounting structure for mounting the carrier device to an object;
         a receiver that receives the nozzle assembly of the animal deterrent canister, the receiver comprising an inner engagement profile that is sized and shaped to receive the flange of the nozzle assembly in an interference engagement such that the nozzle is directed away from the body and the nozzle actuator is positioned toward the body relative to the nozzle;
      an actuator pin that moves between a retracted position away from the actuator and an extended position that depresses the actuator of the animal deterrent canister, the actuator pin being biased toward the retracted position; and
      a pin actuator that, when activated, causes the actuator pin to move from the retracted position to the extended position.

2. The combination of claim 1, wherein the pin actuator comprises a cable housed within a sleeve, the cable having a first end connected to the actuator pin and a second end connected to a hand actuator, the hand actuator applying a compressive force to the cable relative to the sleeve such that the cable moves the actuator pin from the retracted position to the extended position.

3. The combination of claim 2, wherein the hand actuator comprises a plunger.

4. The combination of claim 1, wherein the receiver comprises an opening, the nozzle assembly being inserted through the opening such that the nozzle is directed toward the opening.

5. The combination of claim 1, wherein the body is integrally formed.

6. The combination of claim 1, wherein the mounting structure is configured for mounting the carrier device to a backpack.

7. The combination of claim 1, wherein the carrier device further comprises shoulder straps attached to the mounting structure.

8. The combination of claim 1, wherein the carrier device further comprises clips or ties attached to the mounting structure.

9. A method of deterring an animal attack, the method comprising the steps of:
   providing a carrier device, the carrier device comprising:
      a body having:
         a mounting structure for mounting the carrier device to an object;
         a receiver that is sized to receive a nozzle assembly of an animal deterrent canister, the receiver comprising an inner engagement profile;
      an actuator pin; and
      a pin actuator adjacent to the actuator pin;
   providing an animal deterrent canister, the animal deterrent canister comprising:
      a pressurized vessel containing animal deterrent; and
      a nozzle assembly having a flange, a nozzle actuator, and a nozzle;
   inserting the nozzle assembly of the animal deterrent canister into the carrier device such that the inner engagement profile of the receiver receives the flange of the nozzle assembly in an interference engagement, and such that the nozzle is directed away from the body and the nozzle actuator is toward the body relative to the nozzle;
   mounting the carrier device to an object; and
   actuating the pin actuator to move the actuator pin from a retracted position away from the nozzle actuator to an extended position that applies a downward pressure to depress the actuator of the animal deterrent canister and cause the nozzle to release animal deterrent from the pressurized vessel.

10. The method of claim 9, wherein the pin actuator comprises a cable housed within a sleeve, the cable having a first end connected to the actuator pin and a second end connected to a hand actuator, and wherein actuating the pin actuator comprises apply a compressive force to the cable relative to the sleeve.

11. The method of claim 10, wherein the hand actuator comprises a plunger.

12. The method of claim 9, wherein the actuator pin is biased toward the retracted position.

13. The method of claim 9, wherein the receiver comprises an opening, the nozzle assembly being inserted through the opening such that the nozzle is directed toward the opening.

14. The method of claim 9, wherein the body is integrally formed.

15. The method of claim 9, wherein the mounting structure is configured for mounting the carrier device to a backpack.

16. The method of claim 9, wherein the carrier device further comprises shoulder straps attached to the mounting structure.

17. The method of claim 9, wherein the carrier device further comprises clips or ties attached to the mounting structure.

* * * * *